(12) United States Patent
Kitagawa et al.

(10) Patent No.: US 11,386,658 B2
(45) Date of Patent: Jul. 12, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Nobuhiro Kitagawa, Kanagawa (JP); Jun Shingu, Kanagawa (JP); Suresh Murali, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 125 days.

(21) Appl. No.: 16/382,217

(22) Filed: Apr. 12, 2019

(65) Prior Publication Data

US 2019/0325226 A1  Oct. 24, 2019

(30) Foreign Application Priority Data

Apr. 20, 2018  (JP) .............................. JP2018-081321

(51) Int. Cl.
*G06V 20/40* (2022.01)
*G06V 40/10* (2022.01)

(52) U.S. Cl.
CPC .............. *G06V 20/46* (2022.01); *G06V 20/48* (2022.01); *G06V 20/49* (2022.01); *G06V 40/10* (2022.01)

(58) Field of Classification Search
CPC ........... G06K 9/00744; G06K 9/00362; G06K 9/00758; G06K 9/00765; G06K 9/00718; G06K 9/00724; G10L 25/48
See application file for complete search history.

(56) References Cited

U.S. PATENT DOCUMENTS

| | | | |
|---|---|---|---|
| 5,956,026 A | 9/1999 | Ratakonda | |
| 5,995,095 A | 11/1999 | Ratakonda | |
| 8,731,307 B2 | 5/2014 | Kashiwagi | |
| 2008/0175556 A1* | 7/2008 | Dorai | G06F 16/7844 386/248 |
| 2018/0032845 A1* | 2/2018 | Polak | G06K 9/4604 |
| 2020/0364464 A1* | 11/2020 | Vijayanarasimhan | G06N 3/04 |

FOREIGN PATENT DOCUMENTS

| | | |
|---|---|---|
| JP | 2001527304 | 12/2001 |
| JP | 2003178076 | 6/2003 |
| JP | 2005065191 | 3/2005 |

(Continued)

OTHER PUBLICATIONS

"Office Action of Japan Counterpart Application", dated Feb. 22, 2022, with English translation thereof, p. 1-p. 6.

(Continued)

*Primary Examiner* — Zhitong Chen
(74) *Attorney, Agent, or Firm* — JCIPRNET

(57) ABSTRACT

An information processing apparatus includes a feature extraction unit that analyzes a video to extract a feature element, a discriminating unit that, based on a difference in the feature element for each of multiple portions of the video, performs discrimination that discriminates between an explaining scene and an explained scene, the explaining scene being a scene providing explanation, the explained scene being a captured scene of what is explained in the explaining scene, and a categorizing unit that categorizes each portion of the video based on a result of the discrimination.

11 Claims, 14 Drawing Sheets

(56) References Cited

FOREIGN PATENT DOCUMENTS

| JP | 2007052626 | 3/2007 |
|----|------------|--------|
| JP | 2007082088 | 3/2007 |
| JP | 2011188342 | 9/2011 |

OTHER PUBLICATIONS

Yousuke Watanabe et al., "Evaluation of Scene Retrieval Method Using Telop Information in Language Education Video," IPSJ SIG Technical Report, Dec. 2010, pp. 1-27.

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-081321 filed Apr. 20, 2018.

BACKGROUND

(i) Technical Field

The present disclosure relates an information processing apparatus, and a non-transitory computer readable medium.

(ii) Related Art

There are existing techniques that isolate scenes in a video or recognize a subject matter appearing in each scene. Japanese Unexamined Patent Application Publication No. 2005-65191 discloses a technique that extracts, from moving image data, audio data and time information, which represents the time instant in the moving image data when the corresponding audio is recorded, separates and extracts, through speech recognition, a phrase specifying a spatial position in the moving image, and a phrase serving as metadata, and converts each phrase into text data and stores the resulting text data in association with the time information. Japanese Unexamined Patent Application Publication No. 2007-82088 discloses a technique that registers content scenes, or recognizes the audio or visual portion of content for conversion into text data, and by inserting the text data into a data unit constituting each visual frame or recording the text data into a file dedicated for text data together with a time code, records metadata or text data for marking a scene into a medium as metadata associated with content.

For a video recording an operation process, it may be sometimes desired to isolate a scene explaining an operation to be performed and a scene in which the operation is being performed, and classify these scenes for each operation. This is true not only for a video recording an operation process but also for a variety of videos including an explaining and an explained scene, which is a scene whose explanation is given in the explaining scene. That is, for such videos as well, it may be sometimes desired to isolate explaining and explained scenes, and classify these scenes by their contents.

SUMMARY

Aspects of non-limiting embodiments of the present disclosure relate to an information processing apparatus that, based on a feature element that differs between a portion of a video explaining something and a portion of the video capturing what has been explained, isolates and classifies scenes in the video into explaining and explained scenes, and a non-transitory computer readable medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a feature extraction unit that analyzes a video to extract a feature element, a discriminating unit that, based on a difference in the feature element for each of a plurality of portions of the video, performs discrimination that discriminates between an explaining scene and an explained scene, the explaining scene being a scene providing explanation, the explained scene being a captured scene of what is explained in the explaining scene, and a categorizing unit that categorizes each portion of the video based on a result of the discrimination.

BRIEF DESCRIPTION OF THE DRAWINGS

Exemplary embodiment of the present disclosure will be described in detail based on the following figures, wherein:

FIGS. 4A and 4B each illustrate a hand movement pattern serving as a feature element, of which FIG. 4A illustrates a hand movement pattern in an explaining scene, and FIG. 4B illustrates a hand movement pattern in an operation scene;

FIGS. 5A and 5B each illustrate a difference in a subject serving as a feature element, of which FIG. 5A illustrates a subject in an explaining scene, and FIG. 5B illustrates a subject in an operation scene;

FIGS. 6A and 6B each illustrate a mouse pointer movement pattern serving as a feature element, of which FIG. 6A illustrates a mouse pointer movement pattern in an explaining scene, and FIG. 6B illustrates a mouse pointer movement pattern in an operation scene;

FIGS. 12A and 12B each illustrate selecting of a text on the output screen of an operation procedure file to play back a partial video, of which FIG. 12A illustrates a state before selecting of the text, and FIG. 12B illustrates a state after selecting of the text;

FIGS. 13A and 13B each illustrate selecting of the text of an explaining scene on the output screen of an operation procedure file to play back a partial video, of which FIG. 13A illustrates a state before selecting of the text of the explaining scene, and FIG. 13B illustrates a state after selecting of the text of the explaining scene.

DETAILED DESCRIPTION

Hereinafter, an exemplary embodiment of the present disclosure will be described with reference to the attached drawings.

Functional Configuration of Information Processing Apparatus

Figure 1:
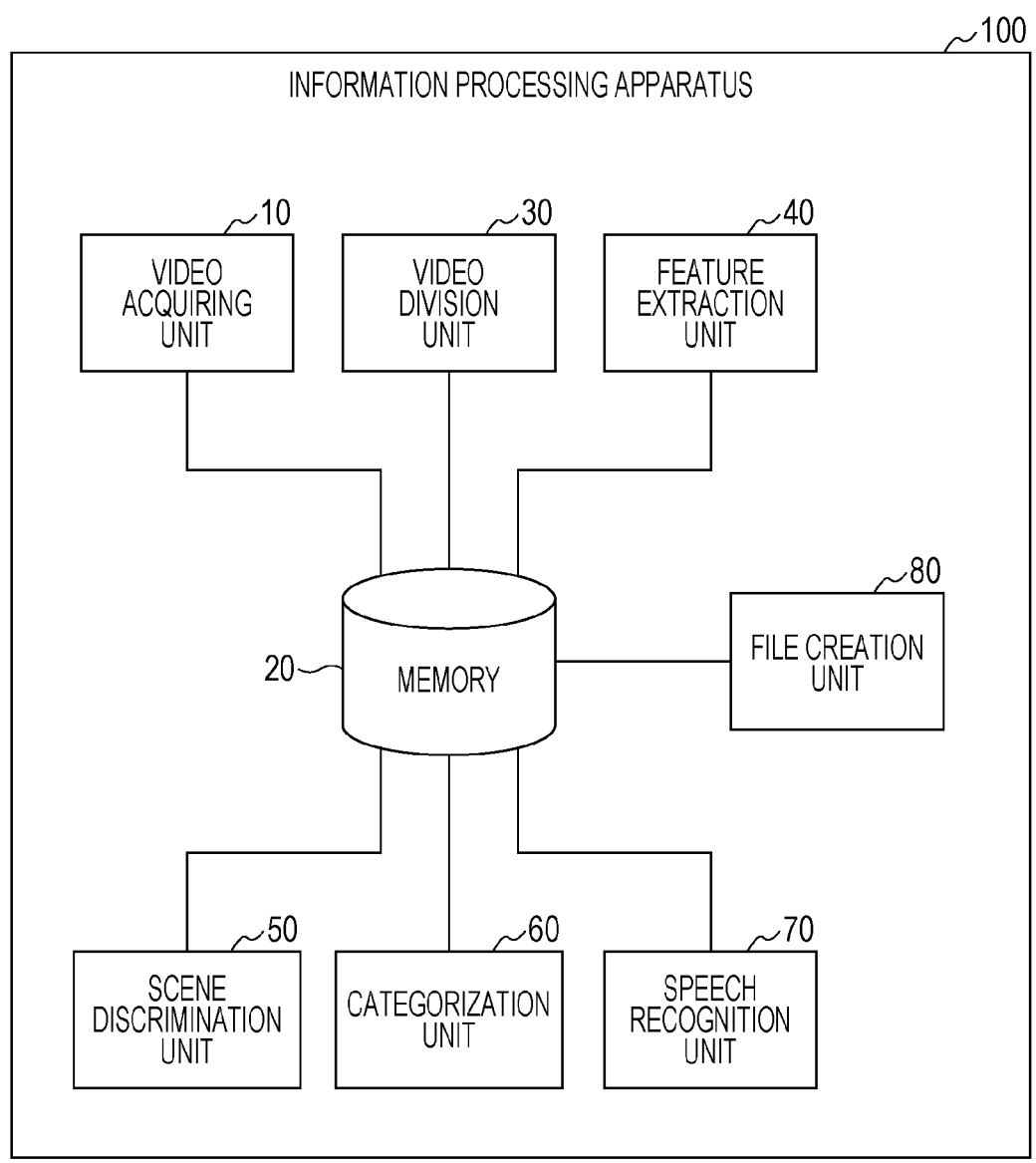
FIG. 1 illustrates the functional configuration of an information processing apparatus according to an exemplary embodiment of the present disclosure.

FIG. 1 illustrates the functional configuration of an information processing apparatus according to an exemplary embodiment of the present disclosure. An information processing apparatus 100 includes a video acquiring unit 10, a memory 20, a video division unit 30, a feature extraction unit 40, a scene discrimination unit 50, a categorization unit 60, a speech recognition unit 70, and a file creation unit 80. The information processing apparatus 100 is implemented by, for example, a personal computer (PC).

The video acquiring unit 10 acquires a video of interest, which is a video to be processed. This video acquisition may be performed by either one of the following methods: connecting a video camera with the information processing apparatus 100, and reading a video stored in the memory of the video camera; and acquiring a video file held in an external memory via a network (not illustrated).

A video of interest according to the exemplary embodiment is a video whose captured scenes include a specific scene and an explaining scene that provides an explanation about the specific scene. A specific scene is what can be referred to as explained scene (a scene capturing what is explained in the explaining scene). An example of a specific scene is a scene of a person as a subject performing some action. Examples of such actions include an operation or manipulation, sport practicing, and musical instrument performance. Examples of specific scenes include scenes of a specific phenomenon (regardless of whether natural or artificial) or event that has occurred (or is occurring). In one example of the exemplary embodiment, an operation video is acquired as a video of interest. An operation video refers to a video of an operation being performed. The type of this operation is not particular limited. An operation video typically includes an explaining scene and an operation scene. An explaining scene refers to a scene explaining what operation is to be performed. An operation scene refers to a scene of the operation being actually carried out. The exemplary embodiment is applicable not only to operation videos but also to a variety of videos that include the specific and explaining scenes mentioned above.

Figure 2:
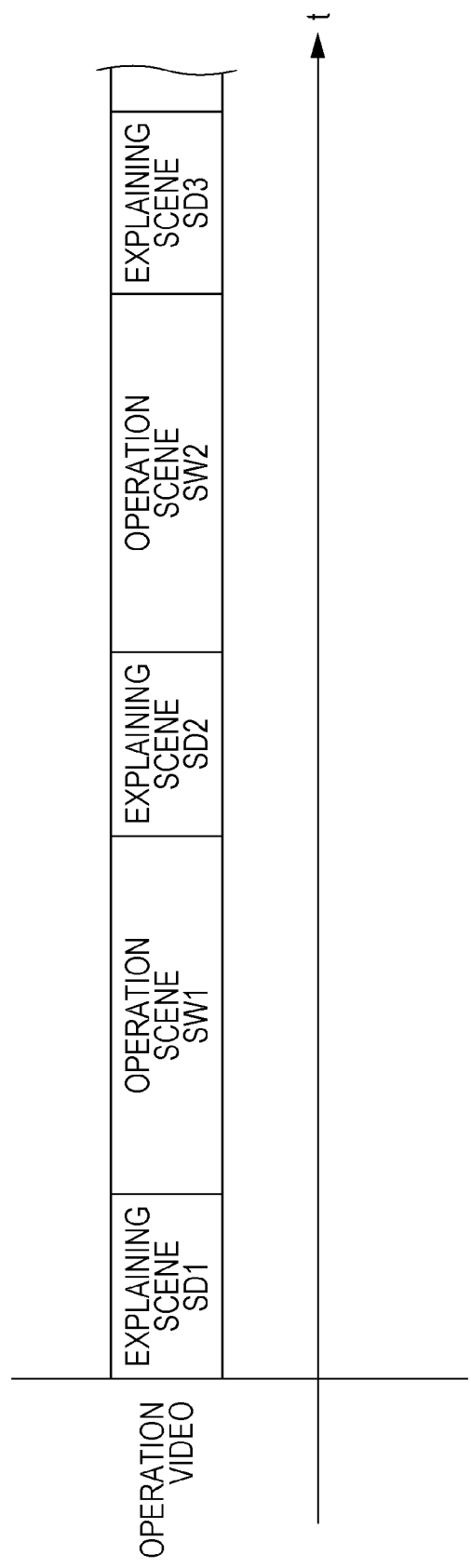
FIG. 2 illustrates an exemplary configuration of an operation video.

FIG. 2 illustrates an exemplary configuration of an operation video. In the operation video illustrated in FIG. 2, explaining scenes SD and operation scenes SW appear alternately. The first scene is an explaining scene SD1, followed by an operation scene SW1 in which an operation explained in the explaining scene SD1 is actually carried out. This is followed by an explaining scene SD2, which is then followed by an operation scene SW2 in which an operation explained in the explaining scene SD2 is actually carried out. As described above, most operation videos are made up of sequentially appearing pairs of an explaining scene and an operation scene in which an explained operation is being performed.

The memory 20 stores and holds an operation video acquired by the video acquiring unit 10. The memory 20 is implemented by, for example, a writable semiconductor memory, such as a random access memory (RAM) or a solid state drive (SSD), or by a magnetic disk device.

The video division unit 30 divides an operation video acquired by the video acquiring unit 10 and held into the memory 20 into multiple partial videos. The video division unit 30 divides an operation video based on, for example, audio recorded in the operation video. Specifically, the video division unit 30 analyzes the audio data of the operation video, and identifies each point (time instant) in the video at which speech is recorded. Then, the video division unit 30 divides the operation video into single partial videos each representing a segment of the video from one speech to the next speech. The generated partial videos are held into the memory 20.

The feature extraction unit 40 analyzes the partial videos into which an operation video is divided by the video division unit 30, and extracts a feature element from each partial video. The feature extraction unit 40 represents an example of a feature extraction unit. A feature element refers to an element that characterizes each of explaining and operation scenes in an operation video. Examples of feature elements include a feature related to the behavior of an operator being captured, and a feature related to the structure of a screen being captured. If an operation video is a recording of a manipulation being performed on an operating screen, a feature related to changes in what is being displayed on the operating screen may be used as a feature element. A detailed description of a feature element will be given later. Information about an extracted feature element is held into the memory 20 in association with the partial video from which the feature element has been extracted.

The scene discrimination unit 50 discriminates, based on a feature element extracted by the feature extraction unit 40, the scenes of individual partial videos obtained by the video division unit 30, and sorts the scenes into explaining and operation scenes. The scene discrimination unit 50 represents an example of a discriminating unit. A detailed description about scene discrimination based on a feature element will be given later. The discrimination results are held into the memory 20 in association with the partial videos being discriminated.

The categorization unit 60 categorizes partial videos for each operation, based on the results of scene discrimination by the scene discrimination unit 50. The categorization unit 60 represents an example of a categorizing unit. As described above with reference to FIG. 2, most operation videos include an explaining scene explaining an operation to be performed, followed by an operation scene in which the operation described in the explaining scene is actually carried out. Accordingly, the categorization unit 60 categorizes an explaining scene and an operation scene following the explaining scene as an explanation and an operation that are related to the same operation. At this time, if multiple partial videos of explaining scenes follow in succession, this is determined by the categorization unit 60 as a succession of multiple explaining scenes related to the same single operation, and if multiple partial videos of operation scenes follow in succession, this is determined by the categorization unit 60 as a succession of multiple operation scenes related to the same single operation. The reason for this is due to the fact that partial videos are created by the video division unit 30 by dividing a video based on speech in the video. For instance, speech in an operation scene is often uttered during breaks in an operation. In such cases, even if multiple scenes are related to one continuous operation, each such scene is isolated as a partial video at each speech utterance. Accordingly, if multiple partial videos of operation scenes follow in succession, such partial videos will be handled as a whole as those of scenes related to one operation. The same applies to the partial videos of explaining scenes. As a result of such categorization by the categorization unit 60, the partial videos are associated for each obtained category and held into the memory 20.

The speech recognition unit 70 performs speech recognition on the audio data of each partial video, and converts obtained speech into text data. The generated text data is held into the memory 20 in association with the partial video including the audio data from which the text data has been generated. The speech recognition by the speech recognition unit 70 may be performed by using an existing speech recognition technique.

The file creation unit 80 generates an operation procedure file by using partial videos categorized for each operation, and text data generated by the speech recognition unit 70. An operation procedure file is a content file for explaining an operation procedure. An operation procedure file is a piece of content that categorizes an operation video for each operation, and associates each partial video with text obtained from the audio of the partial video. The created operation procedure file is held into the memory 20. When an application program capable of executing an operation procedure file reads and executes an operation procedure file, an output screen is generated and displayed on a display (not illustrated). The output screen associates text with an operation video (partial videos) categorized for each operation. The file creation unit 80 represents an example of a screen generating unit.

In an operation procedure file, each partial video and a text corresponding to the particle video are linked. Accordingly, upon selecting a text on the output screen, a partial video corresponding to the selected text is displayed. The configuration and function of the output screen of an operation procedure file will be described later in detail.

Example of Video Division

Next, video division by the video division unit 30 will be described in further detail by way of a specific example. As described above, the video division unit 30 divides an operation video based on, for example, speech recorded in the operation video. Accordingly, an analysis process is performed to discriminate speech from acoustic data recorded in the video. It suffices for this analysis process to be able to distinguish speech from environmental noise, such as the operating noise of a machine or noise generated during use of equipment, and speech recognition is not required at this point. However, since speech is extracted through processing executed by the video division unit 30, the speech recognition to be performed by the speech recognition unit 70 may be performed at this point.

Figure 3:
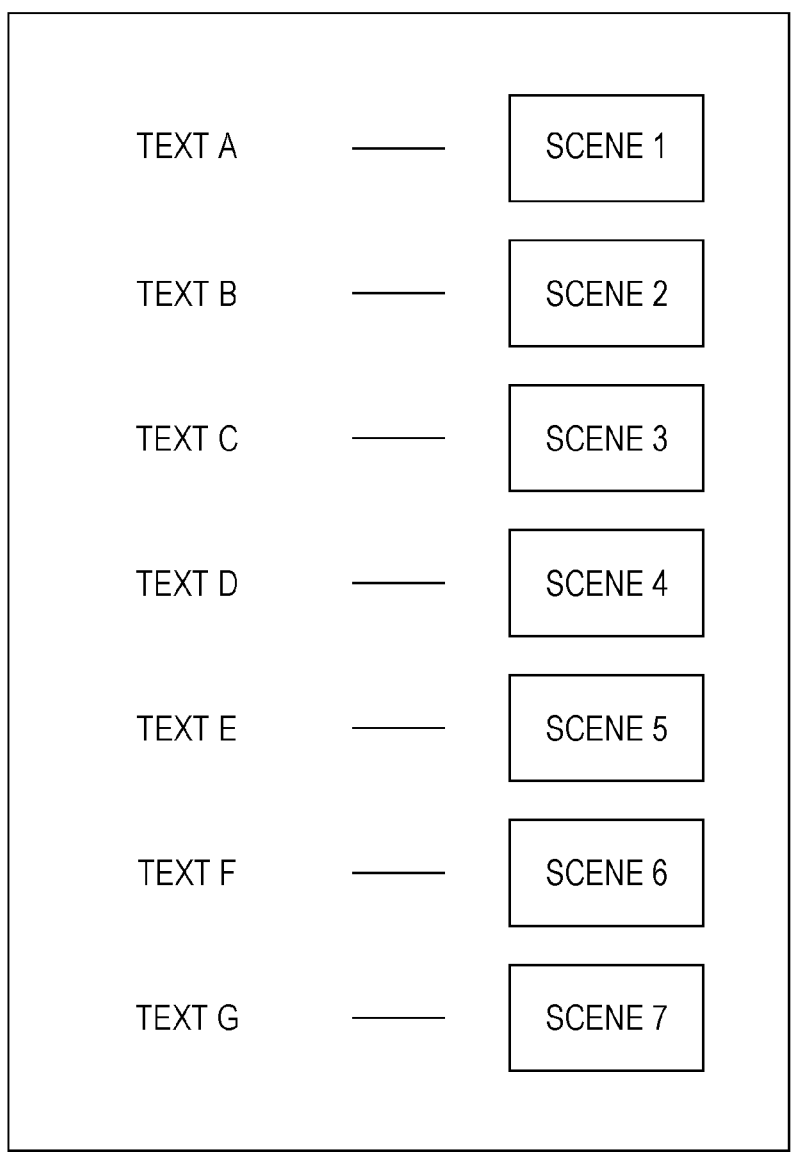
FIG. 3 illustrates an example of video division by a video division unit.

FIG. 3 illustrates an example of video division by the video division unit 30. It is assumed that an operation video of interest includes a recording of seven speeches, Speeches A to G. Each of Speeches A to G is separated from other speeches by an interval of a predetermined time or more. Accordingly, Speeches A to G are determined to be discrete utterances. The video division unit 30 determines the portion of the operation video from the start time of Speech A to the start time of Speech B to be the partial video of Scene 1 corresponding to Speech A. Likewise, the video division unit 30 determines the portion of the operation video from the start time of Speech B to the start time of Speech C to be the partial video of Scene 2 corresponding to Speech B. Likewise, the video division unit 30 determines the portion of the operation video from the start time of Speech C to the start time of Speech D to be the partial video of Scene 3 corresponding to Speech C. Likewise, the video division unit 30 determines the portion of the operation video from the start time of Speech D to the start time of Speech E to be the partial video of Scene 4 corresponding to Speech D. Likewise, the video division unit 30 determines the portion of the operation video from the start time of Speech E to the start time of Speech F to be the partial video of Scene 5 corresponding to Speech E. Likewise, the video division unit 30 determines the portion of the operation video from the start time of Speech F to the start time of Speech G to be the partial video of Scene 6 corresponding to Speech F. Likewise, the video division unit 30 determines the portion of the operation video after the start time of Speech G to be the partial video of Scene 7 corresponding to Speech G. In this way, the operation video is divided into seven partial videos respectively corresponding to Speeches A to G.

Examples of Feature Elements

Next, a feature element extracted from a partial video by the feature extraction unit 40 will be described in further detail by way of specific examples. An example of a feature element is a feature related to the behavior of an operator appearing on a screen. Specifically, a movement pattern of a specific body part of the operator, such as a hand movement pattern or a head or gaze movement pattern, is extracted as a feature element. For example, the following considers a case where hand movements are extracted as a feature element.

Figure 4A:
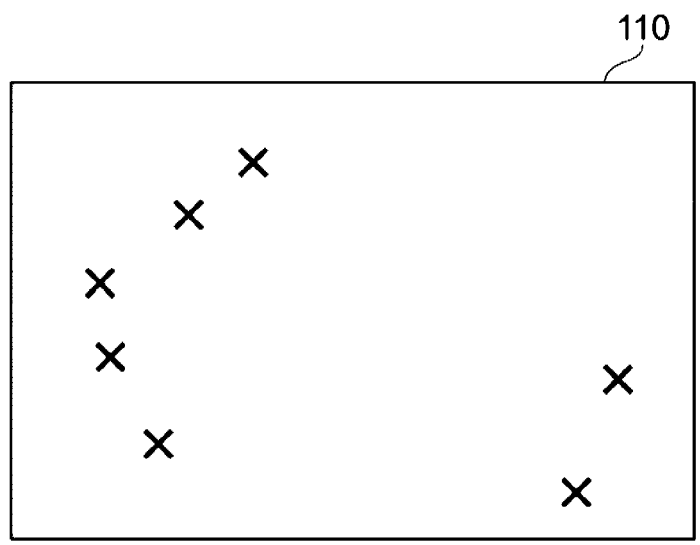
Figure 4B:
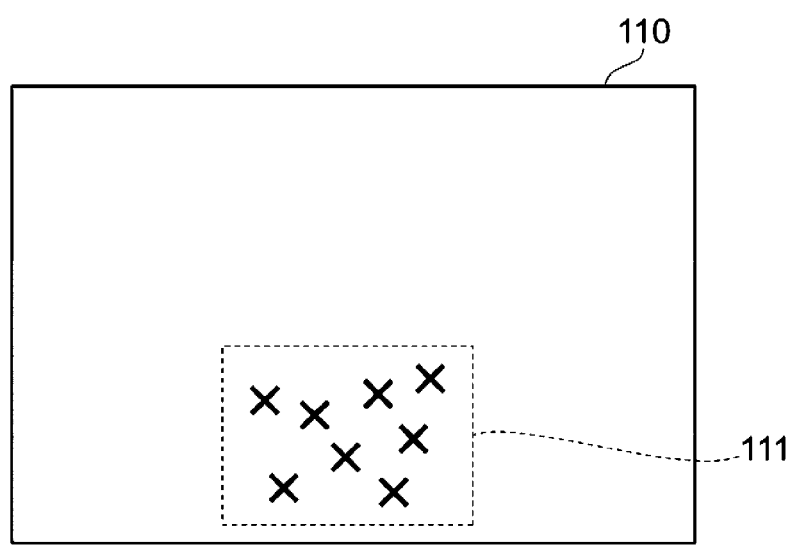

FIGS. 4A and 4B each illustrate a hand movement pattern serving as a feature element. FIG. 4A illustrates a hand movement pattern in an explaining scene, and FIG. 4B illustrates a hand movement pattern in an operation scene. In each of FIGS. 4A and 4B, where the operator's hands are located on a screen 110 showing a partial video is drawn for the corresponding scene at each predetermined interval of time. When explaining an operation, the operator is likely to use gestures to explain what operation will be performed. Consequently, the operator's hands move over a wide area as illustrated in FIG. 4A. By contrast, when performing an operation, the operator's hands are not likely to move too far from where the operation is taking place. Consequently, the range of hand movements falls within a specific narrow area 111 as illustrated in FIG. 4B. Accordingly, as a scene discrimination condition, a predetermined threshold is set for the range of hand movements in a partial video. By using this threshold, a scene is determined to be an explaining scene if the operator's hands move in the scene over a range wider than the threshold, whereas a scene is determined to be an operation scene if the operator's hands move in the scene over a range narrower than the threshold.

If a feature related to the behavior of the operator is to be used as a feature element, a speech pattern uttered by the operator may be used as a feature element. Comparing the speech pattern when the operator is explaining an operation with the speech pattern when the operator is performing the operation, in the latter case, the operator is uttering speech while performing the operation, and thus the rate of speech is likely to be lower than the rate of speech in the former case. Accordingly, as a scene discrimination condition, a predetermined threshold is set for the rate of speech. By using this threshold, a scene is determined to be an explaining scene if the rate of speech in the scene is greater than the threshold, whereas a scene is determined to be an operation scene if the rate of speech in the scene is less than the threshold.

Another example of a feature element is a feature related to the structure of a captured screen. Specifically, a difference in what is being captured as a subject is extracted as a feature element. For example, the following considers a case where information as to whether a subject is a person's image is extracted as a feature element.

Figure 5A:
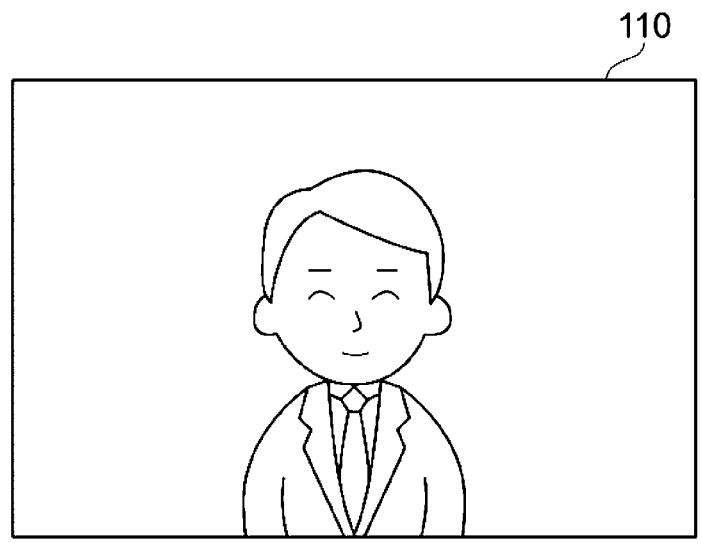
Figure 5B:
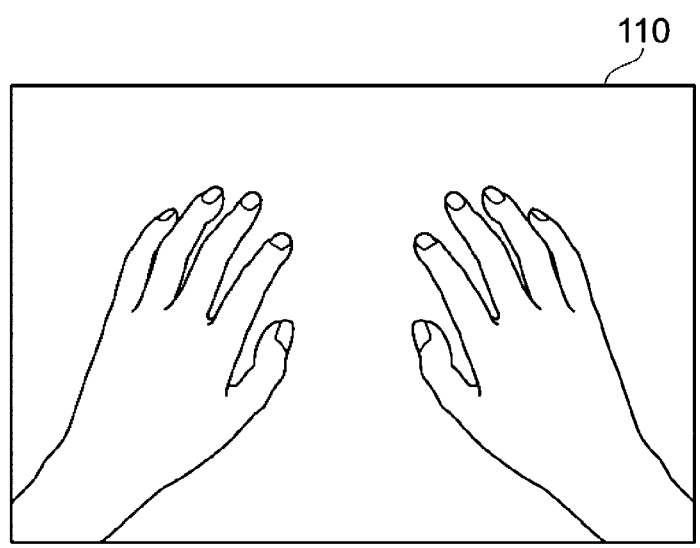

FIGS. 5A and 5B each illustrate a difference in a subject serving as a feature element. FIG. 5A illustrates a subject in an explaining scene, and FIG. 5B illustrates a subject in an operation scene. FIGS. 5A and 5B each illustrate the screen 110 showing the partial video of the corresponding scene. When the operator is explaining an operation, the subject is likely to be the operator explaining the operation himself or herself. Accordingly, the major subject is a person's image as illustrated in FIG. 5A. By contrast, when the operator is performing an operation, the subject is likely to be an area where the operation is taking place (e.g., the area near the operator's hands in the case of a manual operation). Thus, as illustrated in FIG. 5B, the major subject is not a person's image but the area where the operation is being performed. Accordingly, whether the major subject is a person's image is set as a scene discrimination condition. By using this condition, a scene is determined to be an explaining scene if the major subject in the scene is a person's image, whereas a scene is determined to be an operation scene if the major subject in the scene is not a person's image.

Another example of a feature element is a feature related to changes in what is being displayed on an operating screen. This feature can be used if an operation video of interest is a video of a manipulation being performed on the operating screen. Specifically, a pattern of mouse pointer movements or of changes in the shape or color of an image being displayed is extracted as a feature element. For example, the following considers a case where mouse pointer movements are extracted as a feature element.

Figure 6A:
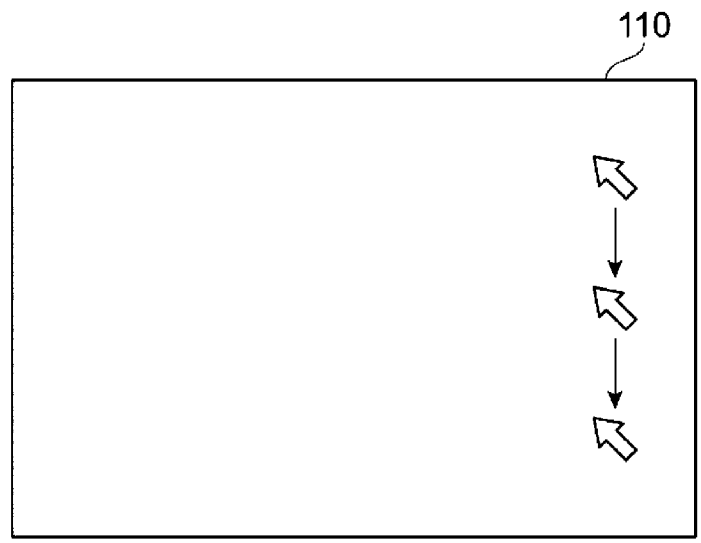
Figure 6B:
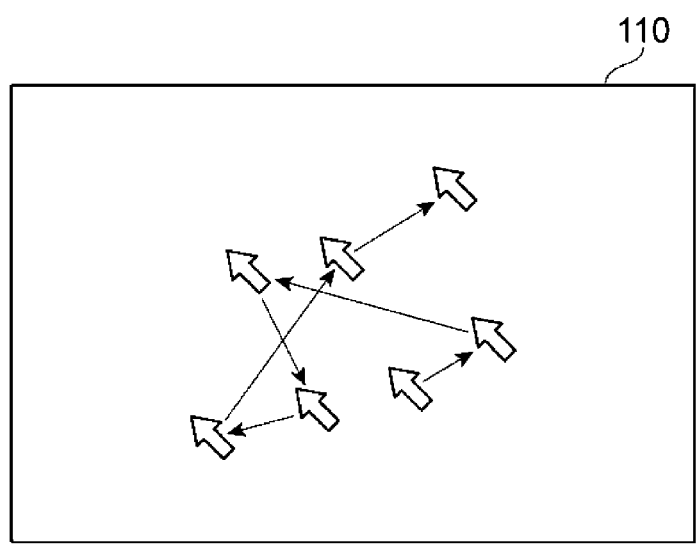

FIGS. 6A and 6B each illustrate a mouse pointer movement pattern serving as a feature element. FIG. 6A illustrates a mouse pointer movement pattern in an explaining scene, and FIG. 6B illustrates a mouse pointer movement pattern in an operation scene. FIGS. 6A and 6B each illustrate, for the corresponding scene, how a mouse pointer has moved within the screen. Now, a case is considered in which the operator explains, as an operation to be performed, a manipulation on an operating screen. In this case, the explanation is mostly about the screen being displayed, and the mouse pointer is thus likely to move only to an extent sufficient to direct attention to a desired area during the explanation. The resulting mouse pointer movements are thus relatively monotonous and moderate as illustrated in FIG. 6A. By contrast, when the operator is performing an operation, the mouse pointer is likely to be manipulated as the operation is carried out. As illustrated in FIG. 6B, the resulting mouse pointer movements in an operation scene are more complex and vigorous than those in an explaining scene. The complexity and vigorousness of mouse pointer movements can be determined by the number of times the mouse pointer changes its direction of movement or the distance moved by the mouse pointer. Accordingly, as a scene discrimination condition, a predetermined threshold is set for each of the number of times the mouse pointer changes its direction of movement in a partial video, and the distance moved by the mouse pointer in the partial video. For values less than the threshold, the corresponding scene is determined to be an explaining scene, and for values greater than the threshold, the corresponding scene is determined to be an operation scene.

Examples of Scene Discrimination

Next, scene discrimination by the scene discrimination unit 50 will be described in further detail by way of specific examples. The scene discrimination unit 50 discriminates whether each partial video is that of an explaining scene or an operation scene, based on a feature element extracted from the partial video. The following describes discrimination between the partial videos of Scenes 1 to 7 described above with reference to FIG. 3.

Figure 7:
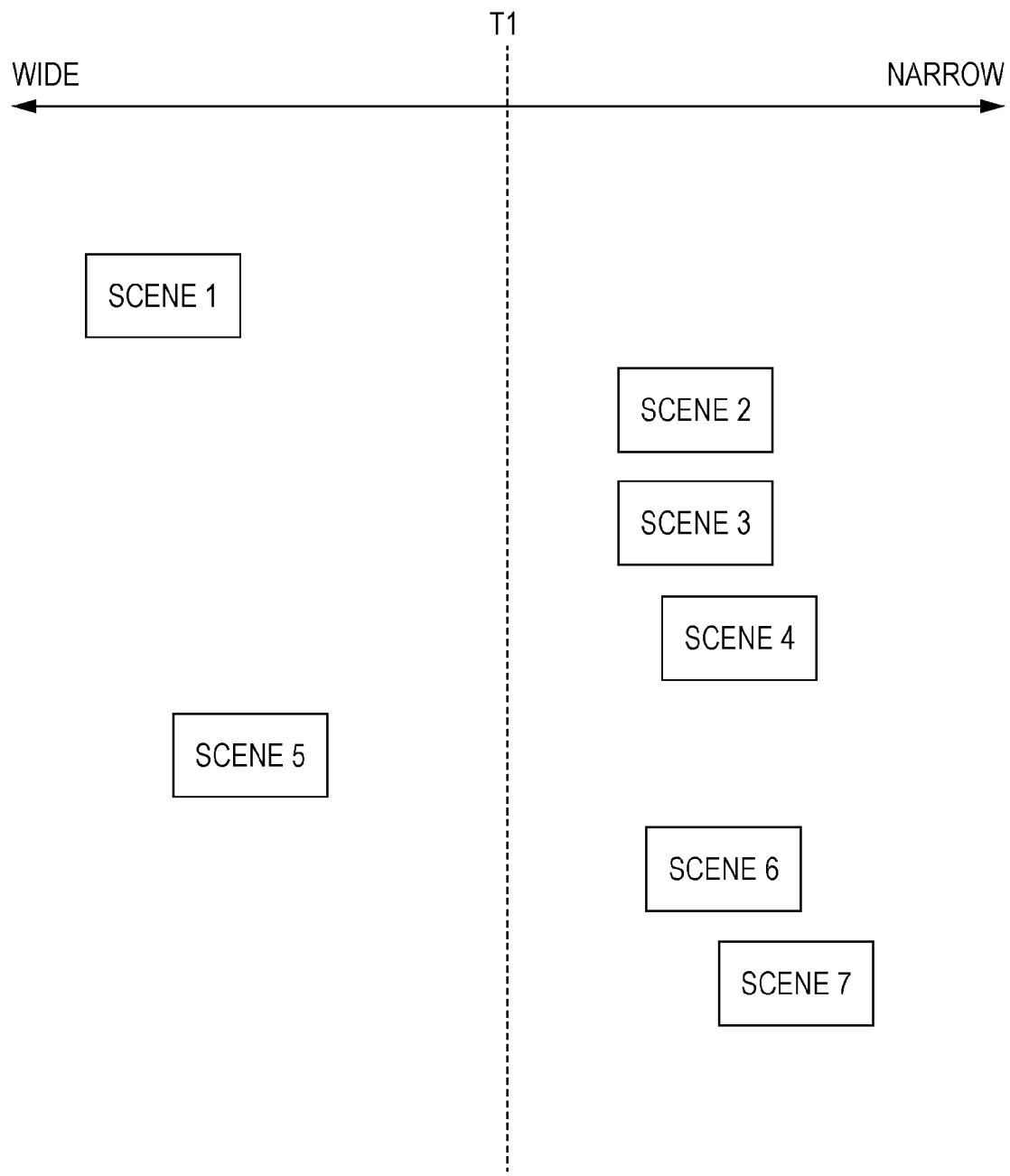
FIG. 7 illustrates an example of scene discrimination performed by using a hand movement pattern as a feature element.

FIG. 7 illustrates an example of scene discrimination performed by using a hand movement pattern as a feature element. Referring to FIG. 7, for Scenes 1 and 5, the area with hand movements is greater than a threshold T1. Accordingly, the scene discrimination unit 50 determines that the respective partial videos of Scenes 1 and 5 correspond to explaining scenes. By contrast, for Scenes 2 to 4, Scene 6, and Scene 7, the area with hand movements is less than the threshold T1. Accordingly, the scene discrimination unit 50 determines that the respective partial videos of Scenes 2 to 4, Scene 6, and Scene 7 correspond to operation scenes.

Figure 8:
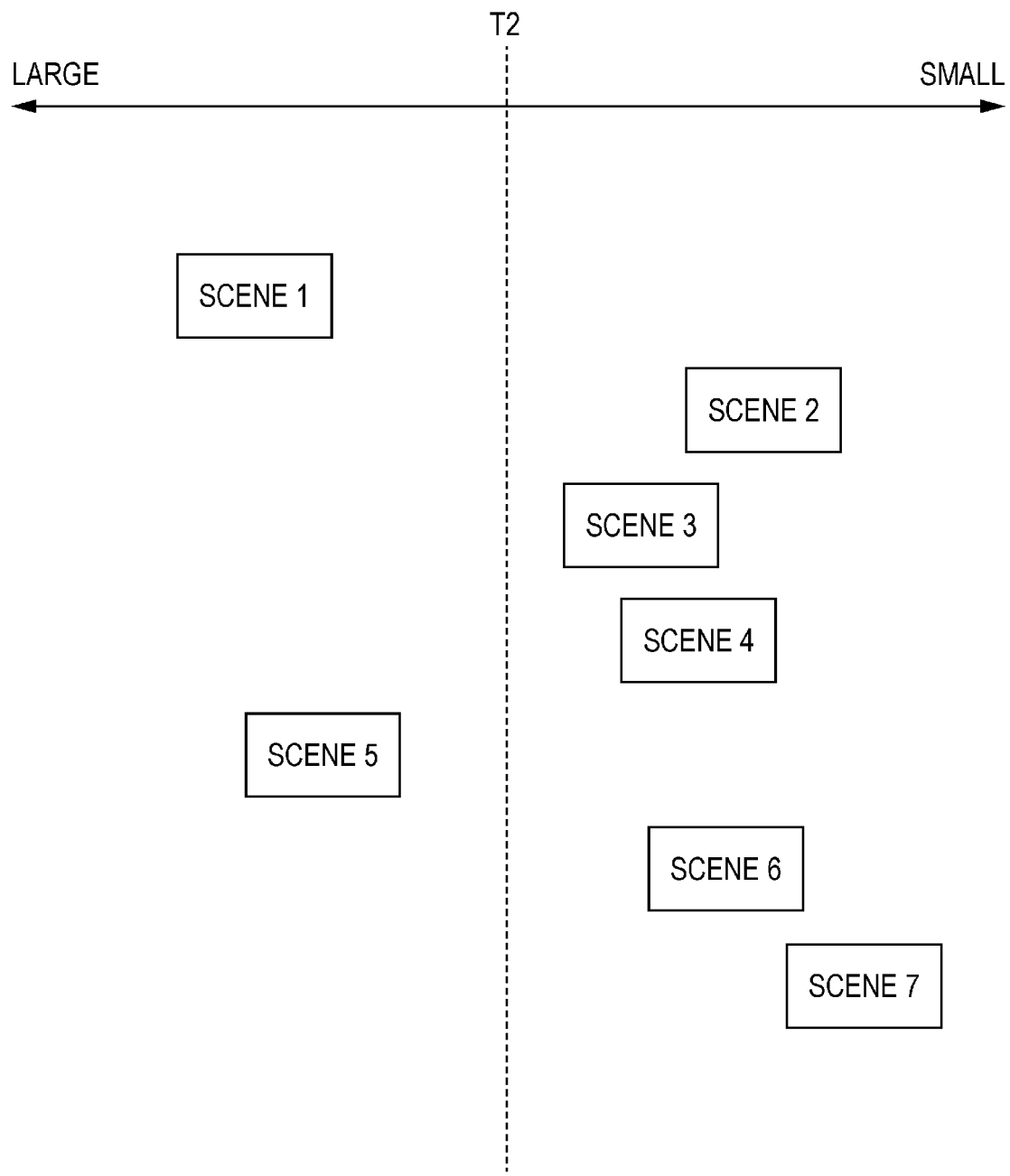
FIG. 8 illustrates an example of scene discrimination performed by using changes in head orientation as a feature element.

FIG. 8 illustrates an example of scene discrimination performed by using changes in head orientation as a feature element. If changes in head orientation are to be used as a feature element, a scene is determined to be an explaining scene if the head orientation changes to various directions in the scene, and a scene is determined to be an operation scene if the head is oriented in more or less the same direction in the scene. Referring to FIG. 8, for Scenes 1 and 5, the variance in head orientation is greater than a threshold T2 (indicative of the head being oriented in various directions). Accordingly, the scene discrimination unit 50 determines that the respective partial videos of Scenes 1 and 5 correspond to explaining scenes. By contrast, for Scenes 2 to 4, Scene 6, and Scene 7, the variance in head orientation is less than the threshold T2 (indicative of the head being oriented in a specific direction). Accordingly, the scene discrimination unit 50 determines that the respective partial videos of Scenes 2 to 4, Scene 6, and Scene 7 correspond to operation scenes.

Figure 9:
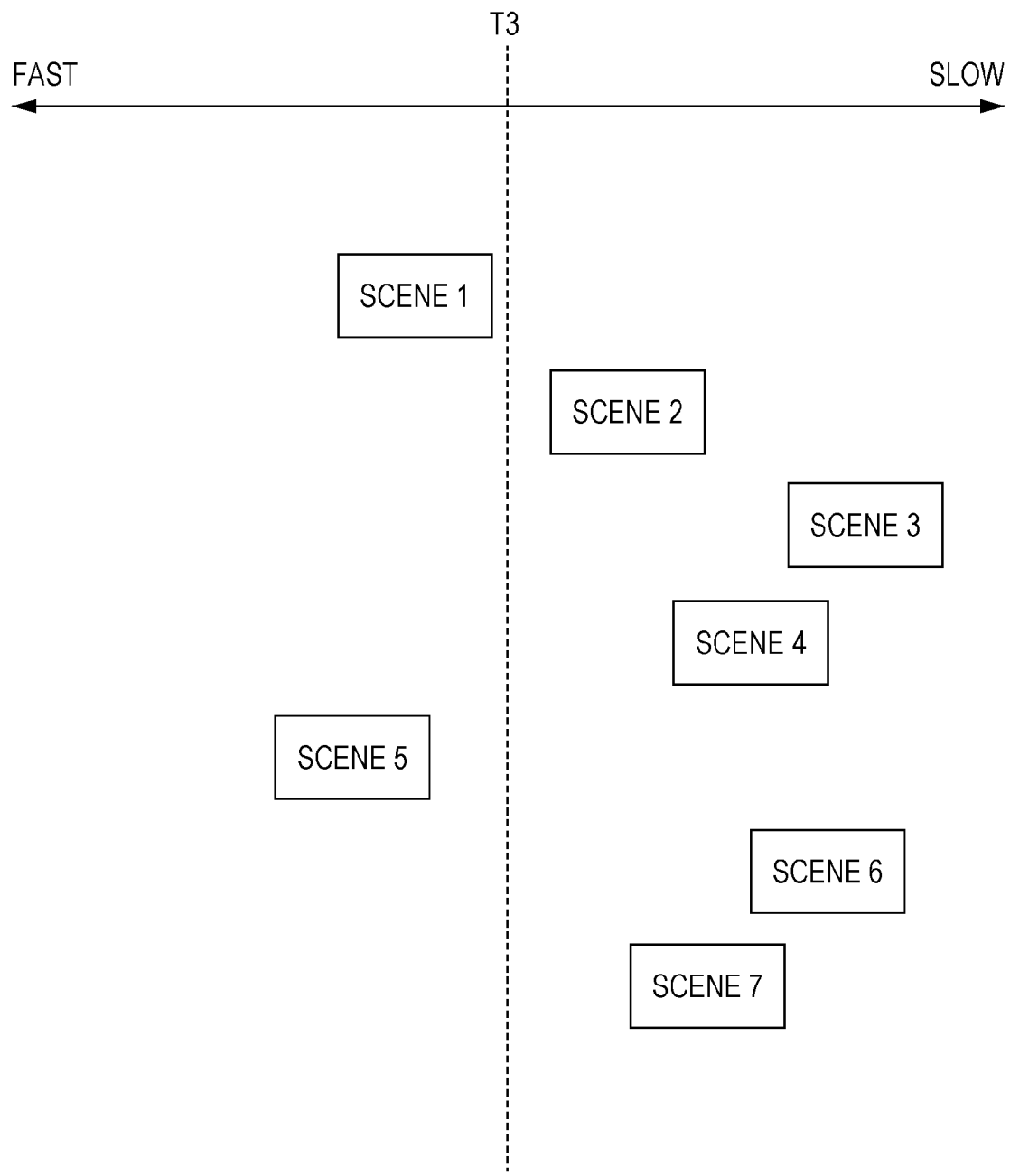
FIG. 9 illustrates an example of scene discrimination performed by using speech rate as a feature element.

FIG. 9 illustrates an example of scene discrimination performed by using speech rate as a feature element. Referring to FIG. 9, for Scenes 1 and 5, the speech rate is greater than a threshold T3. Accordingly, the scene discrimination unit 50 determines that the respective partial videos of Scenes 1 and 5 correspond to explaining scenes. By contrast, for Scenes 2 to 4, Scene 6, and Scene 7, the speech rate is lower than the threshold T3. Accordingly, the scene discrimination unit 50 determines that the respective partial videos of Scenes 2 to 4, Scene 6, and Scene 7 correspond to operation scenes.

Figure 10:
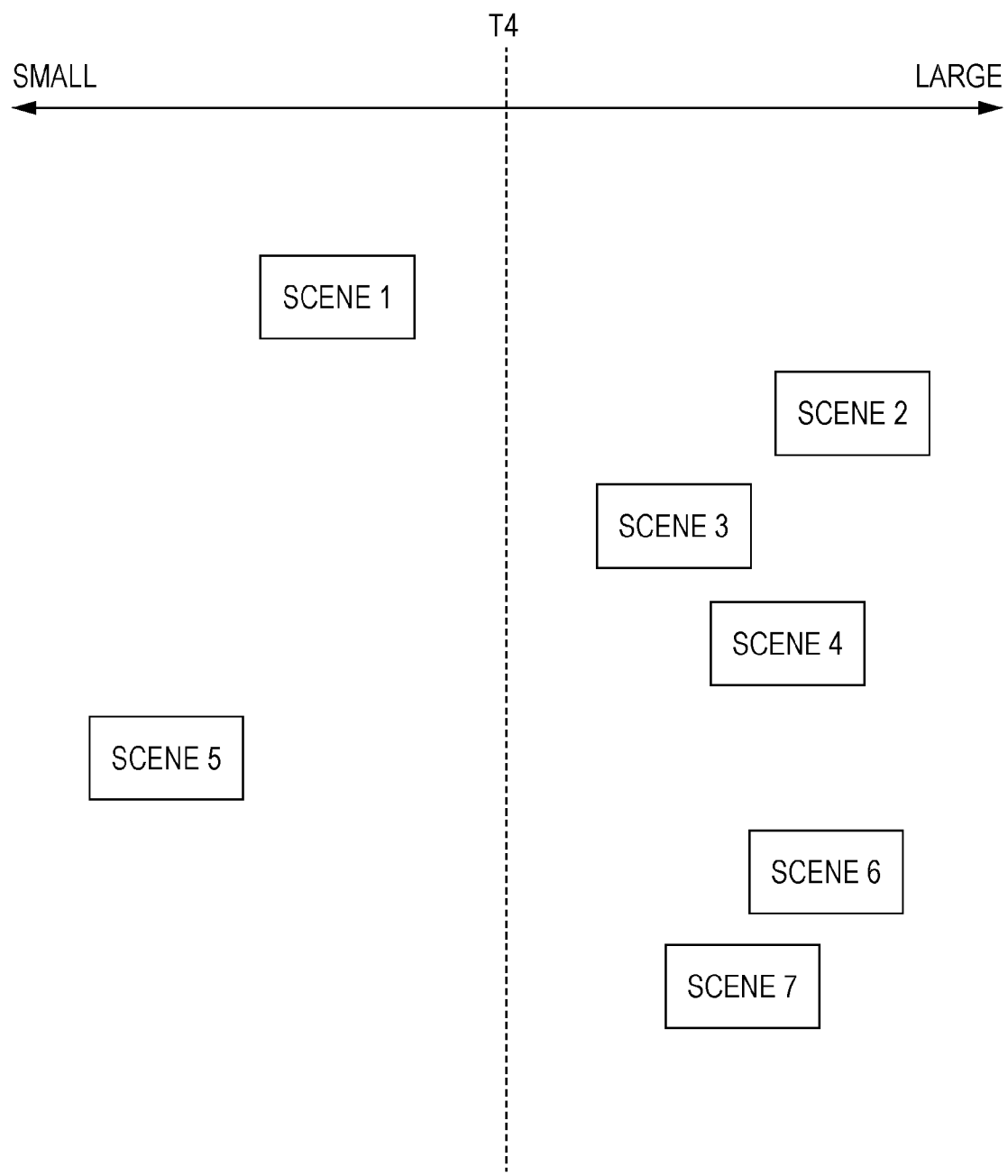
FIG. 10 illustrates an example of scene discrimination performed by using changes in an operating screen as a feature element.

FIG. 10 illustrates an example of scene discrimination performed by using changes in an operating screen as a feature element. This example focuses on the amount of mouse pointer movement, which is taken as representing changes in the operating screen. Referring to FIG. 10, for Scenes 1 and 5, the amount of mouse pointer movement is less than a threshold T4. Accordingly, the scene discrimination unit 50 determines that the respective partial videos of Scenes 1 and 5 correspond to explaining scenes. By contrast, for Scenes 2 to 4, Scene 6, and Scene 7, the amount of mouse pointer movement is greater than the threshold T4. Accordingly, the scene discrimination unit 50 determines that the respective partial videos of Scenes 2 to 4, Scene 6, and Scene 7 correspond to operation scenes.

The foregoing description is directed to several examples in which partial video scenes are discriminated based on a feature element. In all of the above-mentioned examples, the respective partial videos of Scenes 1 and 5 are determined to be explaining scenes, and the respective partial videos of Scenes 2 to 4, Scene 6, and Scene 7 are determined to be operation scenes. However, using different feature elements can result in different determination results. For such cases, discrimination results obtained through determination using a greater number of feature elements may be employed. In another example, scenes may be discriminated by giving different weights to different feature elements. Discriminating scenes based on multiple feature elements improves the accuracy of discrimination. Examples of Output Screen of Operation Procedure File Next, the output screen of an operation procedure file created by the file creation unit 80 will be described in further detail by way of specific examples. As described above, when an operation procedure file is read and executed by an application program, an output screen is generated in accordance with the contents of the operation procedure file, and displayed on the display.

Figure 11:
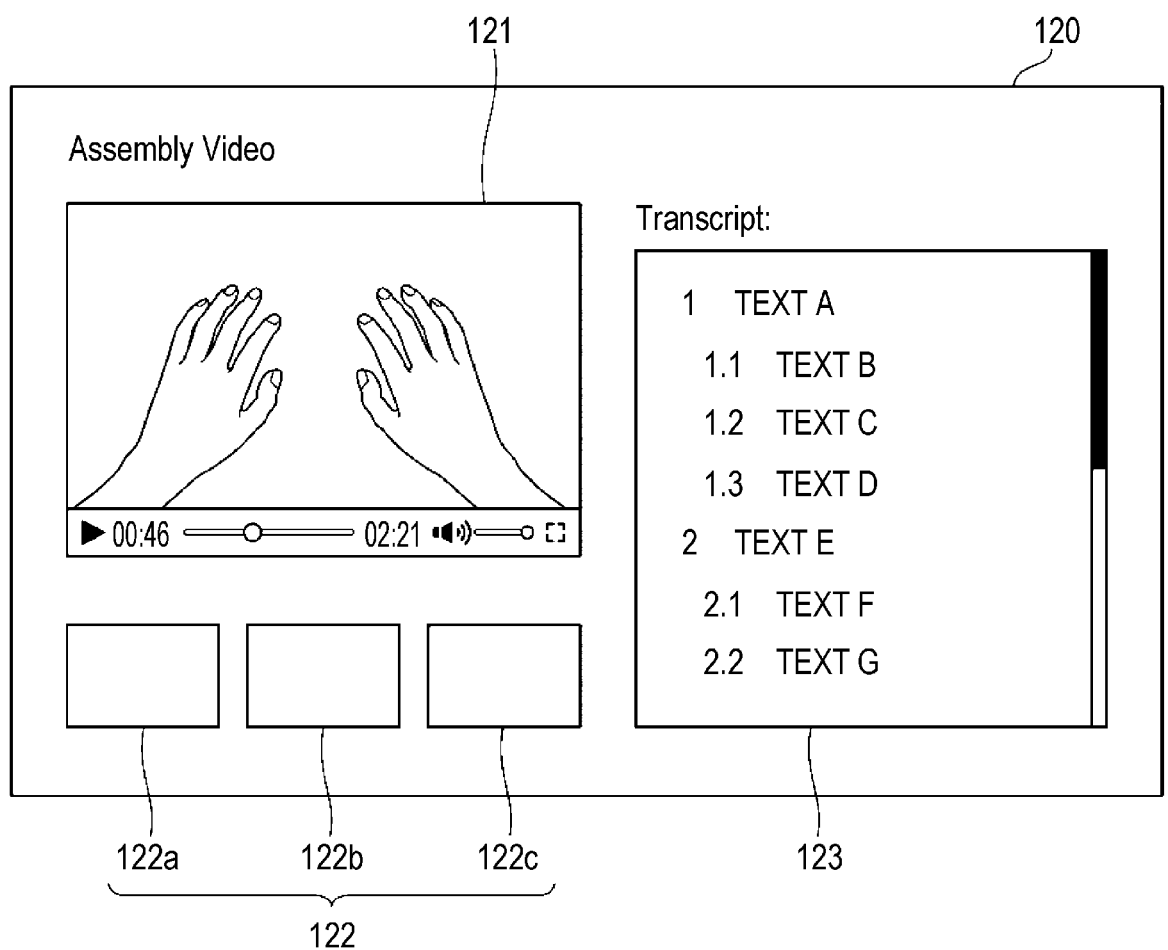
FIG. 11 illustrates an exemplary configuration of an output screen based on an operation procedure file.

FIG. 11 illustrates an exemplary configuration of an output screen based on an operation procedure file. An output screen 120 has a video display area 121 and a reduced-image display area 122 that each display a video, and a text display area 123 that displays text. A video displayed in the video display area 121 is a partial video obtained from an operation video. An image displayed in the reduced-image display area 122 is a reduced image of a partial video. In the example illustrated in FIG. 11, three images 122a, 122b, and 122c are displayed in the reduced-image display area 122. The image 122b represents the partial video displayed in the video display area 121. The image 122a represents the partial video immediately preceding the partial video displayed in the video display area 121. The image 122c represents the partial video immediately following the partial video displayed in the video display area 121. Each text displayed in the text display area 123 is a text acquired from the audio of a partial video and generated by the speech recognition unit 70.

It is assumed that in the example illustrated in FIG. 11, the partial videos and texts in the operation procedure file are related to Scenes 1 to 7 described above with reference to FIG. 3, and that the scenes in these partial videos are identified based on the discrimination results described above with reference to FIGS. 7 and 8. Further, the partial videos and texts in the operation procedure file are categorized for each operation through processing by the categorization unit 60. That is, Scene 1, which is an explaining scene, and Scenes 2 to 4, which are operation scenes following Scene 1, are categorized as corresponding to the same single operation. Further, Scene 5, which is an explaining scene, and Scenes 6 and 7, which are operation scenes following Scene 5, are categorized as corresponding to the same single operation. Accordingly, numbers are given to individual texts displayed in the text display area 123 to indicate how these texts are categorized for each operation. That is, Text A corresponding to Scene 1 is numbered "1", Text B corresponding to Scene 2 is numbered "1.1", Text C corresponding to Scene 3 is numbered "1.2", and Text D corresponding to Scene 4 is numbered "1.3". The number given to Text A has no sub-number attached, whereas each of the numbers given to Texts B to D has a sub-number attached to the number given to Text A. It is clear from these numbers that Texts A to D and Scenes 1 to 4 respectively corresponding to Texts A to D are categorized as corresponding to the same single operation. The number given to Text A with no sub-number attached will be hereinafter referred to as category number. That is, Texts A to D and Scenes 1 to 4 respectively corresponding to Texts A to D represent pieces of content related to an operation categorized by the category number "1".

Likewise, Text E corresponding to Scene 5 is numbered "2", Text F corresponding to Scene 6 is numbered "2.1", and Text G corresponding to Scene 7 is numbered "2.2". The number given to Text E is a category number "2", and each of the numbers given to Texts F and G has a sub-number attached to the category number "2". Accordingly, Texts E to G and Scenes 5 to 7 respectively corresponding to Texts E to G are categorized as corresponding to the same single operation, and represent pieces of content related to an operation categorized by the category number "2". In this way, the output screen 120 of the operation procedure file displays information in a manner that enables discrimination by operation category.

In the operation procedure file, each text is associated with a partial video from which the text has been acquired. On the output screen 120, a link is provided between each text and a partial video corresponding to the text. Each text displayed in the text display area 123 of the output screen 120 thus serves as an index to the corresponding partial video. Selecting a text on the output screen 120 allows the operator to play back the partial video corresponding to the selected text.

Figure 12A:
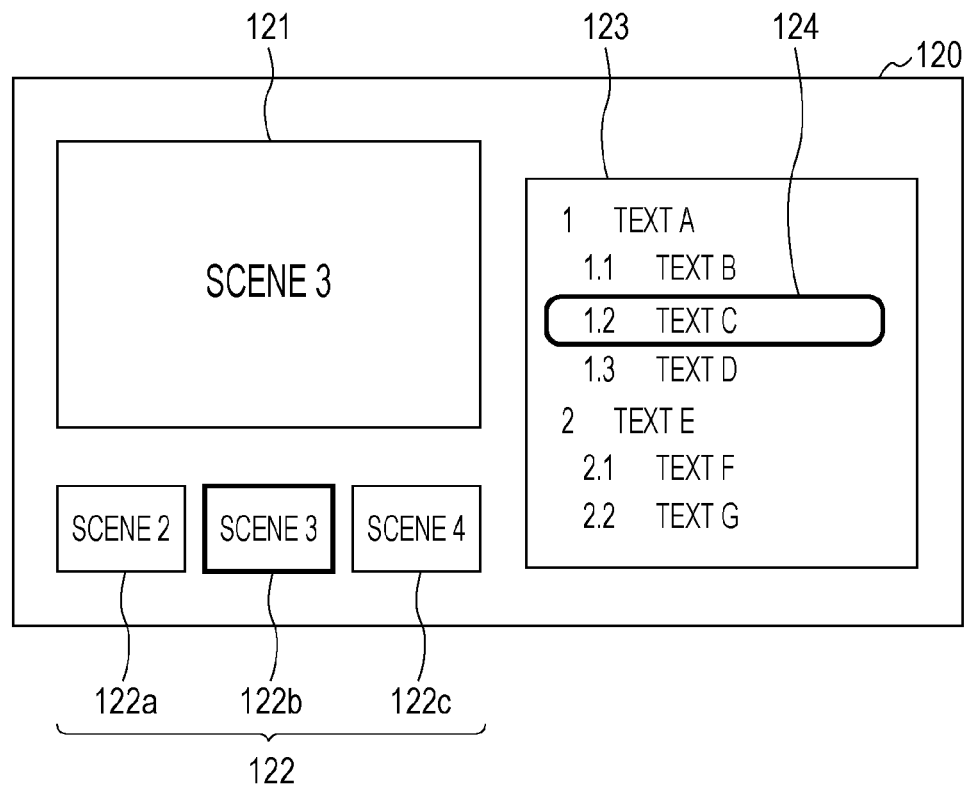
Figure 12B:
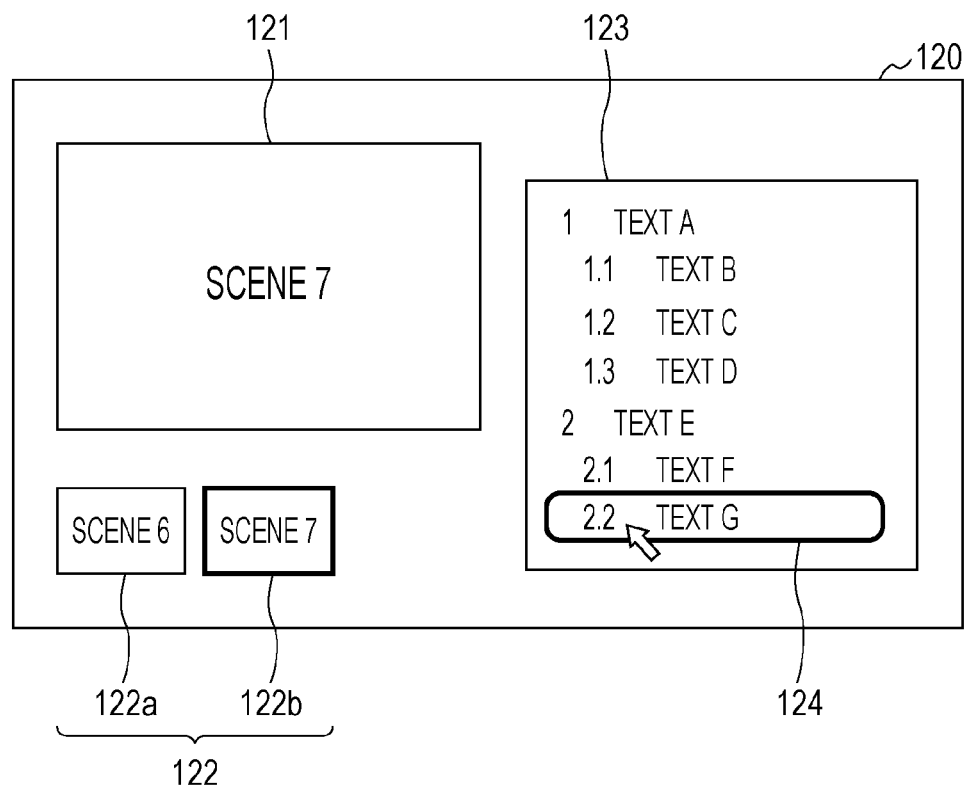

FIGS. 12A and 12B each illustrate selecting (specifying) of a text on the output screen of an operation procedure file to play back a partial video. FIG. 12A illustrates a state before selecting (specifying) of the text, and FIG. 12B illustrates a state after selecting (specifying) of the text. As illustrated in FIG. 12A, before text selection, the partial video of Scene 3 is displayed in the video display area 121 of the output screen 120. In the text display area 123, Text C numbered "1.2", which corresponds to the partial video of Scene 3, is displayed with an indication (which in FIG. 12A is a frame border 124 enclosing Text C) indicating that the corresponding partial video is being displayed. This makes it possible to identify that Text C corresponds to the partial video being currently displayed. Likewise, in the reduced-image display area 122, the image 122b corresponding to the partial video being displayed in the video display area 121 is bounded by a thick frame. Now, it is assumed that Text G numbered "2.2" is selected in this state (see FIG. 12B). This text selection is performed by, for example, performing a predetermined action such as a mouse click on the text to be specified in the text display area 123. Referring to FIG. 12B, in the text display area 123, Text G numbered "2.2", which is the text thus selected, is displayed with the frame border 124 enclosing Text G, and the partial video of Scene 7 is being displayed in the video display area 121. That is, selecting Text G causes a jump to and playback of the video of Scene 7 corresponding to Text G. In FIG. 12B, the partial video displayed in the video display area 121 is the last partial video in the operation procedure file, and there are no other partial videos following this last partial video. Accordingly, the image 122c, which shows the partial video following the partial video being currently displayed, is not displayed in the reduced-image display area 122.

Now, a further description is given of the text and partial video of an explaining scene. In an operation procedure file, a video is used to provide a visual representation of an operation being carried out. In this sense, an operation procedure file is not necessarily required to include a partial video for an explaining scene. Accordingly, for an explaining scene, an operation procedure file may not include a partial video corresponding to its text. In this case, the text of an explaining scene in the operation procedure file is associated with the entire operation category (scene-by-scene content category) under which the explaining scene is included. In one example, if a link is to be made between a text and a partial video on the output screen 120 of an operation procedure file as described above, the text of an explaining scene is linked to the first video belonging to the operation category under which the explaining scene is included.

Figure 13A:
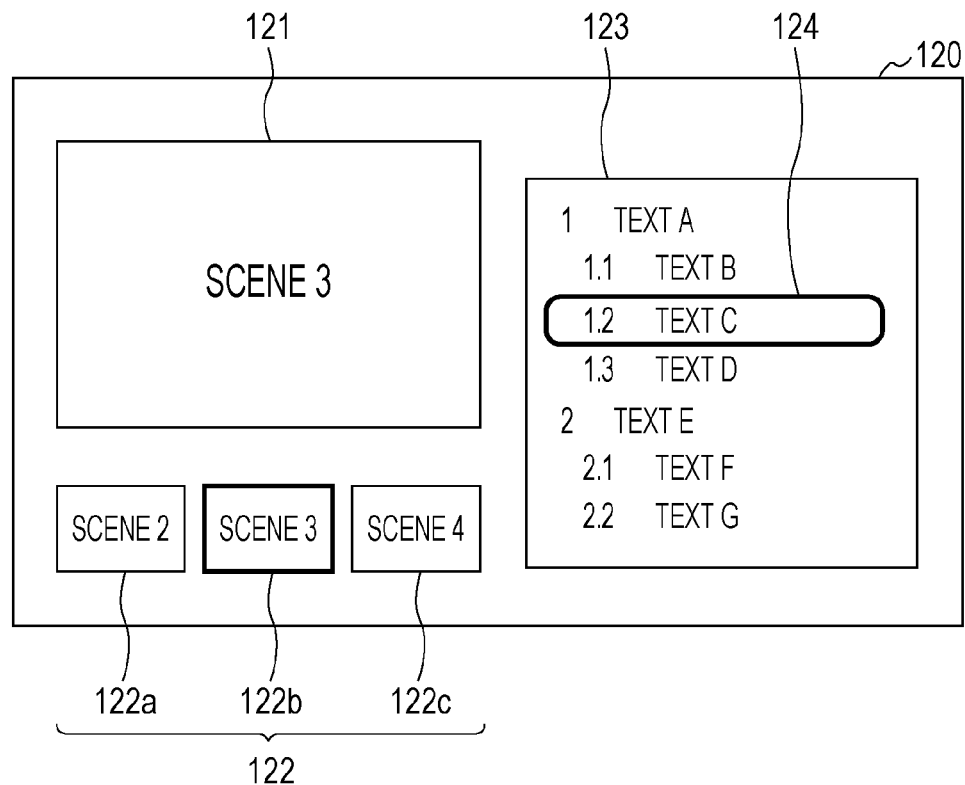
Figure 13B:
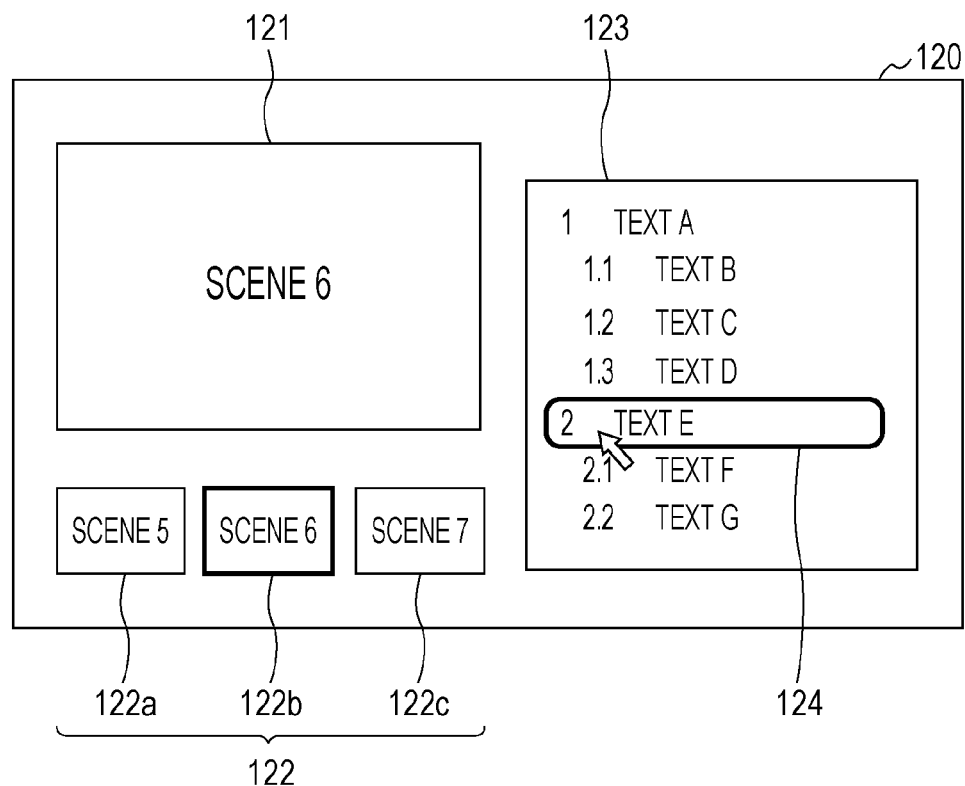

FIGS. 13A and 13B each illustrate selecting (specifying) of the text of an explaining scene on the output screen of an operation procedure file to play back a partial video. FIG. 13A illustrates a state before selecting (specifying) of the text of the explaining scene, and FIG. 13B illustrates a state after selecting (specifying) of the text of the explaining scene. The state before text selection is the same as the state illustrated in FIG. 12B. That is, the partial video of Scene 3 is displayed in the video display area 121 of the output screen 120, and in the text display area 123, Text C numbered "1.2", which corresponds to the partial video of Scene 3, is displayed with an indication (frame border 124) indicating that the corresponding partial video is being displayed. Now, it is assumed that Text E numbered "2" is selected in this state. Referring to FIG. 13B, in the text display area 123, Text E numbered "2", which is the text thus selected, is displayed with the frame border 124 enclosing Text E. In the video display area 121, the first partial video belonging to the operation category including Texts E to G is displayed in the video display area 121. In the present case, the partial video of Scene 5 corresponding to Text E is an explaining scene, and thus has been deleted. Accordingly, the partial video of Scene 6, which is the first partial video belonging to this operation category, is displayed in the video display area 121. That is, selecting Text E of an explaining scene causes a jump to and playback of the partial video of Scene 6, which is the first partial video among a series of partial videos belong to the operation category under which Text E is included.

Exemplary Hardware Configuration

Figure 14:
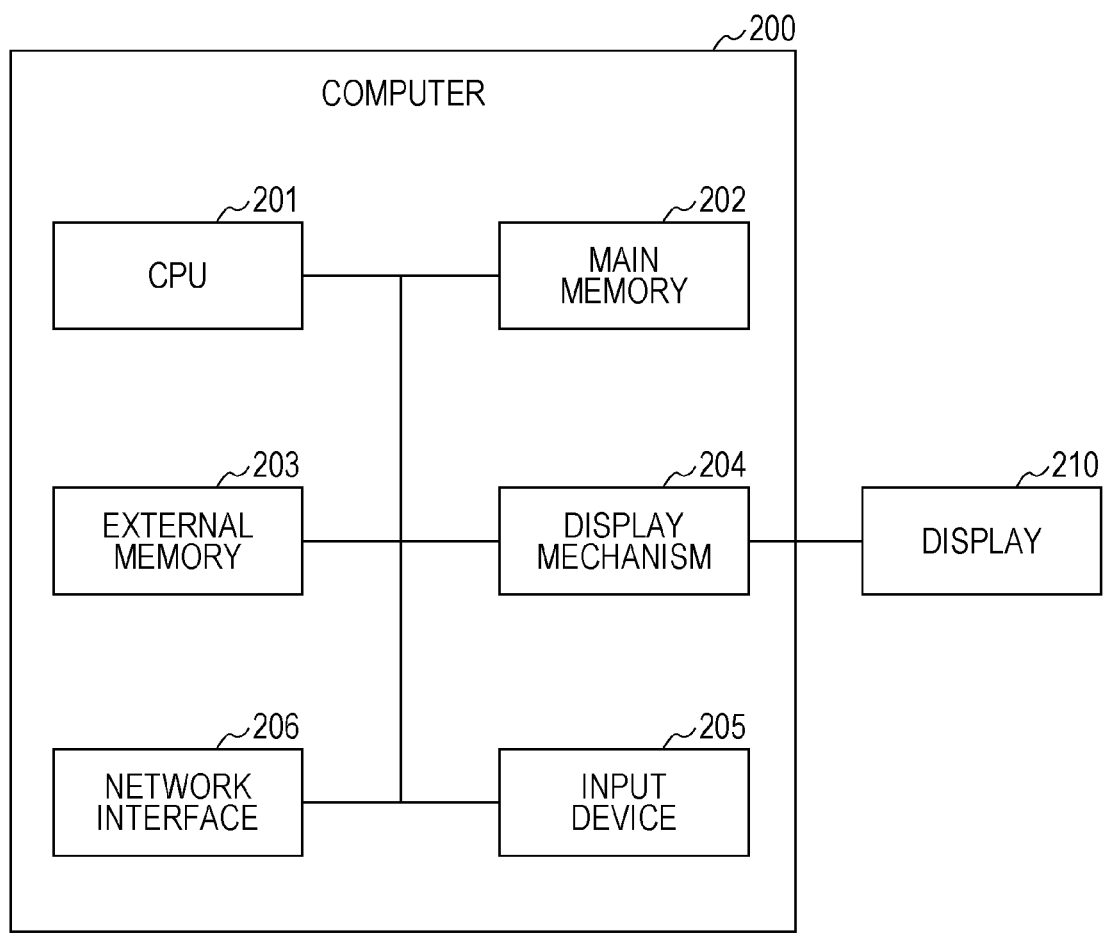
FIG. 14 illustrates an exemplary hardware configuration of a computer used as an information processing apparatus.

FIG. 14 illustrates an exemplary hardware configuration of a computer used as the information processing apparatus 100. A computer 200 illustrated in FIG. 14 includes a central processing unit (CPU) 201, which serves as a computing unit, and a main memory 202 and an external memory 203, which each serve as a memory. The CPU 201 reads a program stored in the external memory 203 into the main memory 202, and executes the program. As the main memory 202, for example, a random access memory (RAM) is used. As the external memory 203, for example, a magnetic disk device or a solid state drive (SSD) is used. The computer 200 also includes a display mechanism 204 for displaying and outputting information on a display 210, and an input device 205 used by the user of the computer 200 to make an input. As the input device 205, for example, a keyboard or a mouse is used. The computer 200 also includes a network interface 206 for connecting to a network. It is to be understood that the configuration of the computer 200 illustrated in FIG. 14 is for illustrative purposes only, and that the configuration of the computer according to the exemplary embodiment is not limited to the example illustrated in FIG. 14. For example, a non-volatile memory such as a flash memory, or a read only memory (ROM) may be also used as a memory.

If the information processing apparatus 100 illustrated in FIG. 1 is implemented by the computer 200 illustrated in FIG. 14, the video acquiring unit 10 is implemented by, for example, the network interface 206. The memory 20 is implemented by, for example, the main memory 202 or the external memory 203. The video division unit 30, the feature extraction unit 40, the scene discrimination unit 50, the categorization unit 60, the speech recognition unit 70, and the file creation unit 80 are implemented by, for example, execution of a program by the CPU 201.

Although an exemplary embodiment of the present disclosure has been described above, the technical scope of the present disclosure is not limited to the above-mentioned exemplary embodiment. It is to be understood that various alterations and structural substitutions not departing from the technical idea or scope of the present disclosure are within the scope of the present disclosure. For example, the file creation unit 80 may transform a text corresponding to an explaining scene in an operation procedure file into the title of an operation category. In an explaining scene, fixed standard phrases such as "Firstly, perform XX operation" or "Next, perform XX" are often uttered to indicate what operation will be performed. Accordingly, text shaping is performed such that a word representing the ordinal position of an operation category, such as "firstly", "at first", or "next", and the predicate at the end of the corresponding text are deleted. This enables a text corresponding to an explaining scene to be displayed on the output screen 120 as the title of an operation category.

Features to be extracted by the feature extraction unit 40 are not limited to those mentioned above. For example, as an exemplary case where a feature related to the behavior of the operator is used as a feature element, extracting the rate of speech by the operator as a feature has been described above. In another example, the volume in a speech or other characteristics may be extracted as a feature. In still another example, the processing up to speech recognition may be performed at this point to extract, as a feature, the frequency of occurrences of reference terms such as "here" and "this". In this case, if the frequency of occurrences of such reference terms in a partial video is greater than a threshold, the scene of the partial video may be determined to be an operation scene.

The exemplary embodiment is applicable to, in addition to operation videos, a variety of videos including explaining and explained scenes. For videos whose explaining scenes explain an object other than an operation, scene discrimination may be performed by selectively or additionally using one or more feature elements characterizing explaining and explained scenes, in accordance with the specific object being explained (such as sport practicing, a musical instrument performance, a phenomenon, or an event).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
analyze a video to extract a feature element;
based on a difference in the feature element for each of a plurality of portions of the video, perform discrimination that discriminates between an explaining scene and an explained scene, the explaining scene being a scene providing explanation, the explained scene being a captured scene of what is explained in the explaining scene; and categorize each portion of the video based on a result of the discrimination, and generate an output screen displaying each portion of the video being categorized and a text obtained from audio corresponding to the portion of the video being categorized, wherein the output screen associates each portion of the video with the text obtained from audio corresponding to the portion of the video, and a selection on a part of the text causes playback of the portion of the video corresponding to the selected part of the text.

2. The information processing apparatus according to claim 1, wherein the processor extracts, as the feature element, a feature related to a behavior of a person who is being captured, the feature being obtained by analyzing the video, wherein the feature related to a behavior of a person extracted by the processor comprises a speech pattern uttered by the person, and wherein the processor discriminates between the explaining scene and the explained scene by using the speech pattern as a discriminating condition.

3. The information processing apparatus according to claim 1, wherein the processor extracts, as the feature element, a feature related to image structure, the feature being obtained by analyzing the video.

4. The information processing apparatus according to claim 3, wherein the video comprises a video of an operation and a video of explanation of the operation, wherein the processor extracts, as the feature related to image structure, a feature that enables differentiation between an image whose subject is an operator and an image whose subject is an operated area where the operation is being performed, and wherein the processor discriminates between the explaining scene and the explained scene by using, as a discriminating condition, a determination of whether a portion of the video is the image whose subject is the operator or the image whose subject is the operated area.

5. The information processing apparatus according to claim 1, wherein the processor extracts, as the feature element, a feature related to changes in a specific displayed object displayed on an operating screen, the feature being obtained by analyzing the video that records a manipulation being performed on the operating screen, and wherein the processor discriminates between the explaining scene and the explained scene by using, as a discriminating condition, a pattern of the changes in the displayed object.

6. The information processing apparatus according to claim 1, wherein the processor deletes, from among the plurality of portions of the video, a video of the explaining scene.

7. The information processing apparatus according to claim 6, wherein the processor associates a text corresponding to the deleted video of the explaining scene, with a video of the explained scene immediately following the explaining scene.

8. The information processing apparatus according to claim 1, wherein the text obtained from audio corresponding to each portion of the video comprises a first text and a second text, the first text corresponding to a video of the explaining scene, the second text corresponding to a video of the explained scene, and wherein the output screen generated by the processor displays the text in a manner that enables discrimination between the first text and the second text.

9. The information processing apparatus according to claim 1, wherein the output screen generated by the processor displays the text corresponding to each portion of the video in a manner that enables discrimination of each portion of the video categorized by the processor.

10. A non-transitory computer readable medium storing a program causing a computer to execute a process, the process comprising:

analyzing a video to extract a feature element;

based on a difference in the feature element for each of a plurality of portions of the video, discriminating between an explaining scene and an explained scene, the explaining scene being a scene providing explanation, the explained scene being a captured scene of what is explained in the explaining scene; and categorizing each portion of the video based on a result of the discriminating, and generating an output screen displaying each portion of the video being categorized and a text obtained from audio corresponding to the portion of the video being categorized, wherein the output screen associates each portion of the video with the text obtained from audio corresponding to the portion of the video, and a selection on a part of the text causes playback of the portion of the video corresponding to the selected part of the text.

11. An information processing apparatus comprising:

feature extracting means for analyzing a video to extract a feature element;

discriminating means for, based on a difference in the feature element for each of a plurality of portions of the video, discriminating between an explaining scene and an explained scene, the explaining scene being a scene providing explanation, the explained scene being a captured scene of what is explained in the explaining scene; and categorizing means for categorizing each portion of the video based on a result of the discriminating, and generating an output screen displaying each portion of the video being categorized and a text obtained from audio corresponding to the portion of the video being categorized, wherein the output screen associates each portion of the video with the text obtained from audio corresponding to the portion of the video, and a selection on a part of the text causes playback of the portion of the video corresponding to the selected part of the text.

* * * * *